July 6, 1937.  M. E. COLLINS  2,085,900

FOCUSING DEVICE FOR SOUND RECORDERS

Filed March 21, 1936

INVENTOR
MILFORD E. COLLINS
BY
ATTORNEY

Patented July 6, 1937

2,085,900

UNITED STATES PATENT OFFICE 2,085,900

FOCUSING DEVICE FOR SOUND RECORDERS

Milford E. Collins, Collingswood, N. J., assignor to Radio Corporation of America, a corporation of Delaware Application March 21, 1936, Serial No. 70,009

2 Claims. (Cl. 179—100.3)

This invention relates to a focusing device for determining the accurate focus of a sound recording optical system in sound recorders and particularly the type of sound recorders incorporated in motion picture cameras.

It is customary in certain types of motion picture cameras for certain purposes such as newsreel recording, etc., to include sound recording mechanism in the camera. In one type of camera, i. e., that known as the Akeley, the sound recording optical system is built into the camera and an attachment is placed at the rear of the camera comprising a number of rollers over which the film runs after leaving the picture gate. Due to the mechanical arrangement of the parts it has heretofore been extremely difficult to properly focus the optical system upon the film at the sound recording point as the optical system, being on the interior of the camera, is not readily accessible for viewing.

One object of this invention is to provide a central means for focusing the recording beam in such a device.

Another object of my invention is to provide a focusing device which can be readily attached to or removed from the camera.

Another object of my invention is to provide such a focusing device which will not interfere with the normal operation of the camera.

Another object of my invention is to provide such a focusing device which may remain attached to the camera during operation.

Other and incidental objects of my invention will be apparent to those skilled in the art from a reading of the following specification and an inspection of the accompanying drawing in which, Figure 1 is a front view of the film roller in focusing position.

Figure 3:
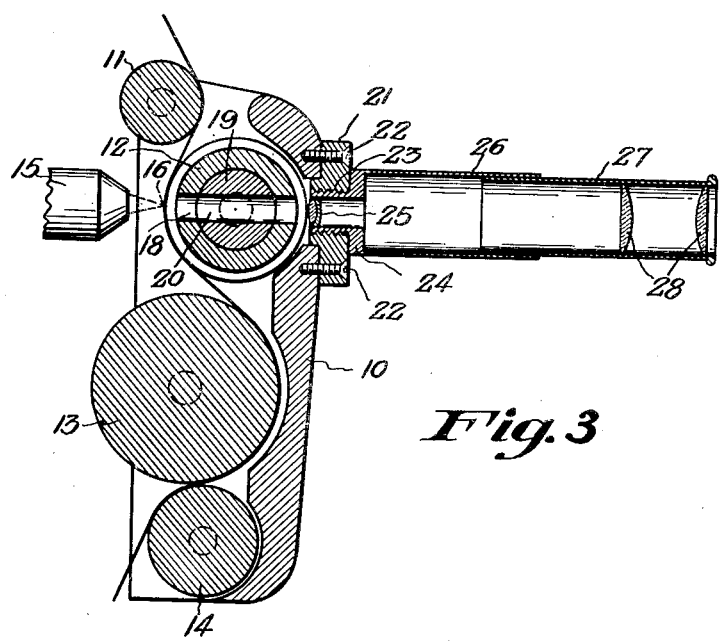
Figure 3 is a longitudinal section of the apparatus in focusing position.

As shown in Fig. 3 the film handling system for the sound recording includes a casing member 10 which carries the rollers 11, 12, 13 and 14. In cooperative relation with the film adjacent to roller 12 is located a sound recording optical system the end of which is indicated at 15 and which images the light upon the film at 16 at which point the focusing is to be determined.

Figure 1:
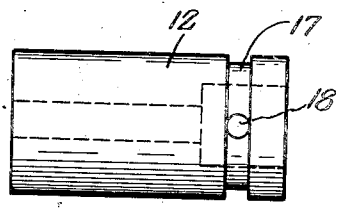
Figure 2:
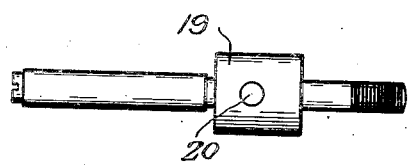
Figure 2 is a front view of the roller shaft.

In the performance of my invention I provide the roller 12 with a groove 17 underneath the sound track area and the entire width thereof. In alignment with this groove 17 and the sound track I provide in the roller a diametral hole 18 of the same size as the width of the sound track. As shown in Figure 2 the shaft for the roller is provided with an enlarged portion at 19 and through this enlarged portion there is provided a hole 20.

When the shaft 19 is installed in the camera it is arranged with the hole 20 in alignment with the optical system and it will be apparent that when the roller 12 is rotated to the proper position the holes 18 and 20 will be in alignment permitting inspection of the image on the film from the opposite side of the roller.

On the outside of the casing 10, I provide a mounting ring 21 secured to the casing by screws 22 and this ring is interiorly threaded as indicated at 23. A focusing microscope is provided which includes an end member 24 which is threaded to fit the member 21 and which carries an appropriate objective 25. This member also includes a tube 26 into which the eyepiece tube 27, fitted with appropriate lenses 28, slides. The focal length of the lens 25 is of course so chosen as to properly image the line of light on the film at the point 16 for magnification by the eyepiece lenses 28.

It will be apparent that if it is desired to leave this focusing device on the camera while in operation the eyepiece 28 may be capped or the eyepiece may be removed and the tube 26 may be capped. Alternatively the entire focusing device may be unscrewed from the member 21, an opaque plate plug screwed into the aperture to prevent fogging of the film by light admitted through the holes 18 and 20.

Having now described my invention I claim:

1. Sound recording apparatus comprising a recording optical system, a roller arranged to support a record strip at the recording point and provided with an aperture in alignment with the record area of said strip and adapted to be aligned with said recording optical system, and focusing means including a viewing microscope in alignment with said aperture.

2. Sound recording apparatus comprising a recording optical system, a roller arranged to support a record strip at the recording point and provided with an aperture in alignment with the record area of said strip and adapted to be aligned with said recording optical system, a shaft supporting said roller and provided with an aperture in alignment with said recording optical system adapted to register with the aperture in the said roller, and focusing means including a viewing microscope in alignment with said apertures.

MILFORD E. COLLINS.